US010534377B2

(12) United States Patent
Dolezilek et al.

(10) Patent No.: US 10,534,377 B2
(45) Date of Patent: Jan. 14, 2020

(54) AUTOMATION OF WATER FLOW IN NETWORKS

(71) Applicant: Schweitzer Engineering Laboratories, Inc., Pullman, WA (US)

(72) Inventors: David J. Dolezilek, Pullman, WA (US); Amandeep Singh Kalra, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 59 days.

(21) Appl. No.: 15/920,037

(22) Filed: Mar. 13, 2018

(65) Prior Publication Data
US 2018/0203472 A1 Jul. 19, 2018

Related U.S. Application Data

(63) Continuation of application No. 14/180,627, filed on Feb. 14, 2014, now abandoned.
(Continued)

(51) Int. Cl.
*G05D 7/06* (2006.01)
*E02B 7/20* (2006.01)
(Continued)

(52) U.S. Cl.
CPC .............. *G05D 7/0641* (2013.01); *E02B 3/00* (2013.01); *E02B 5/06* (2013.01); *E02B 7/20* (2013.01);
(Continued)

(58) Field of Classification Search
CPC ........... G05D 7/06; G05D 7/0617–067; G05D 7/688; E02B 7/20; E02B 8/045;
(Continued)

(56) References Cited

U.S. PATENT DOCUMENTS 4,209,131 A * 6/1980 Barash ................... A01G 25/16
137/624.2
4,545,396 A * 10/1985 Miller .................... A01G 25/16
137/78.3
(Continued)

FOREIGN PATENT DOCUMENTS

GB 2187573 A * 9/1987 .............. G05D 9/12
WO WO-2013100763 A1 * 7/2013

OTHER PUBLICATIONS

Anonymous, "Scada Qualifications & Products", Sutron [online], 2006 [retrieved Jul. 7, 2019], Retrieved from Internet: <URL: http://lighthouse.tamucc.edu/dnrpub/Sutron/XPert/Corporate%20Capabilities/SCADA%20Project%20Descriptions.pdf>, pp. 1-19.*
(Continued)

*Primary Examiner* — Todd Aguilera
(74) *Attorney, Agent, or Firm* — Justin K. Flanagan

(57) ABSTRACT

Disclosed is a control system for a water network. The control system includes a plurality of remotely-located monitoring and or monitoring and automatic control stations each including an automation controller for local control and automation, and each in communication via a dual-ring communication topology for system or wide-area control. The dual-ring facilitates redundant peer-to-peer data exchange to provide upstream and downstream water flow and water quality information. Systems described herein may calculate flow differential based on water flow data from each of the monitoring stations, and control flow based on the calculated flow differential.

20 Claims, 7 Drawing Sheets

Related U.S. Application Data

(60) Provisional application No. 61/775,417, filed on Mar. 8, 2013.

(51) Int. Cl.
*E02B 8/04* (2006.01)
*E02B 13/02* (2006.01)
*E02B 3/00* (2006.01)
*E02B 5/06* (2006.01)
*H04L 12/42* (2006.01)

(52) U.S. Cl.
CPC .............. *E02B 8/045* (2013.01); *E02B 13/02* (2013.01); *G05D 7/067* (2013.01); *H04L 12/42* (2013.01); *Y10T 137/877* (2015.04)

(58) Field of Classification Search
CPC . E02B 13/00; E02B 13/02; E02B 3/00; E02B 5/06; Y10T 137/1866; Y10T 137/189; Y10T 137/402; Y10T 137/7758–7759; Y10T 137/7761; Y10T 137/877; A01G 25/06; A01G 25/16; A01G 25/167; H04B 7/14–17; H04W 84/047; H04L 12/42–437; H04L 12/4637
See application file for complete search history.

(56) References Cited

U.S. PATENT DOCUMENTS

| | | | | |
|---|---|---|---|---|
| 5,038,268 A * | 8/1991 | Krause | ............... | G05B 19/0421 137/624.2 |
| 5,124,990 A * | 6/1992 | Williamson | ...... | H04L 12/40006 340/650 |
| 6,366,584 B1 * | 4/2002 | Gulliford | ................ | H04J 3/085 370/258 |
| 6,600,971 B1 * | 7/2003 | Smith | .................... | G05B 15/02 700/17 |
| 6,633,823 B2 * | 10/2003 | Bartone | .................... | H02J 3/14 700/295 |
| 7,283,916 B2 * | 10/2007 | Cahill-O'Brien | ...... | G06Q 50/06 702/64 |
| 7,383,721 B2 * | 6/2008 | Parsons | ................. | A01G 25/16 73/46 |
| 7,715,887 B2 * | 5/2010 | Cloutier | ................. | F41H 11/00 455/574 |
| 8,103,389 B2 * | 1/2012 | Golden | .................... | H02J 3/14 700/295 |
| 8,190,381 B2 * | 5/2012 | Spanier | ................. | G01R 22/10 702/60 |
| 8,331,855 B2 * | 12/2012 | Williams | ................ | H04L 45/24 455/13.1 |
| 8,793,767 B2 * | 7/2014 | Schweitzer, III | ..... | G06F 21/606 726/3 |
| 9,705,305 B2 * | 7/2017 | Dolezilek | ........... | H02J 13/0013 |
| 2001/0018328 A1 * | 8/2001 | Ohkura | .............. | H04B 7/15542 455/15 |
| 2003/0026660 A1 * | 2/2003 | Wu | ........................ | E02B 7/205 405/87 |
| 2006/0202051 A1 * | 9/2006 | Parsons | ................. | A01G 25/16 239/69 |
| 2007/0271006 A1 * | 11/2007 | Golden | .................... | H02J 3/14 700/295 |
| 2013/0340833 A1 * | 12/2013 | Alonazy | .................. | F17D 3/01 137/2 |
| 2014/0068711 A1 * | 3/2014 | Schweitzer, III | ..... | G06F 21/606 726/3 |
| 2015/0311714 A1 * | 10/2015 | Dolezilek | ........... | H02J 13/0013 700/286 |

OTHER PUBLICATIONS

Dolezilek, D., et al., "Power Management and Automation Scheme for Water Canal Networks", Schweitzer Engineering Laboratories, Inc [online], 2015 [retrieved May 3, 2016], Retrieved from Internet: <URL: https://cdn.selinc.com//assets/Literature/Publications/Technical%20Papers/6585_PowerManagement_AK_20130212_Web.pdf.*

Anonymous, SEL-3031 Serial Radio Transceiver Instruction Manual, Schweitzer Engineering Laboratories, Inc., 2010 [retrieved Dec. 8, 2016], Retrieved from Internet: <URL:https://fccid.io/R34SEL-3031>, whole document.*

PCT/US2015/022795 Patent Cooperation Treaty, International Search Report and Written Opinion of the International Searching Authority, dated Jun. 19, 2015.*

Campbell Scientific, Inc., "Canal Control" May 2005.*

Donia, Noha Samir: "Development of El-Salam Canal Automation System", Journal of Water Resource and Protection, Aug. 2012.*

Campbell Scientific, Inc. "Water Measurement and Control Systems for Water Applications" Oct. 9, 2013.*

* cited by examiner

```
//Calculates flow using the orifice equation
Diff_Head: = (AVG_US_LEVEL – AVG_DS_LEVEL); //Differential head calculation
IF(Diff_Head < 0 OR Diff_Head = 0) THEN //If upstream level is less than downstream level
    QVALUE: = 0; //Zero flow condition
        AL_Diff : = TRUE; //Set low differential head alarm
ELSE//Compute flow using orifice equation
QVALUE = Dis_Coeff*(GATE_WIDTH)*(GATE_POS)*(Eqt_Var)*EXPT(Diff_Head, 0.5);
AL_Diff : = False; //Sufficient differential head
END_IF
```

FIGURE 5

AUTOMATION OF WATER FLOW IN NETWORKS

RELATED APPLICATION

This application claims priority under 35 U.S.C. § 120 as a continuation application of U.S. patent application Ser. No. 14/180,627 filed on 14 Feb. 2014 titled "Automation of Water Flow in Networks" naming David J. Dolezilek and Amandeep Singh Kalra as inventors, which claims benefit under 35 U.S.C. § 119(e) of U.S. Provisional Application No. 61/775,417, filed 8 Mar. 2013, titled "Power Management and Automation Scheme for Water Canal Networks" naming David Dolezilek and Amandeep Kalra as inventors, both of which are hereby incorporated by reference herein in their entireties.

TECHNICAL FIELD

This disclosure generally relates to management of water networks and, more specifically, to automation systems for managing water flow.

BRIEF DESCRIPTION OF THE DRAWINGS

Non-limiting and non-exhaustive embodiments of the disclosure are described, including various embodiments of the disclosure with reference to the figures, in which:

FIG. 5 is a listing of a computer program code for quantifying water flow in a water flow control system according to embodiments presented herein.

DETAILED DESCRIPTION

Figure 1:
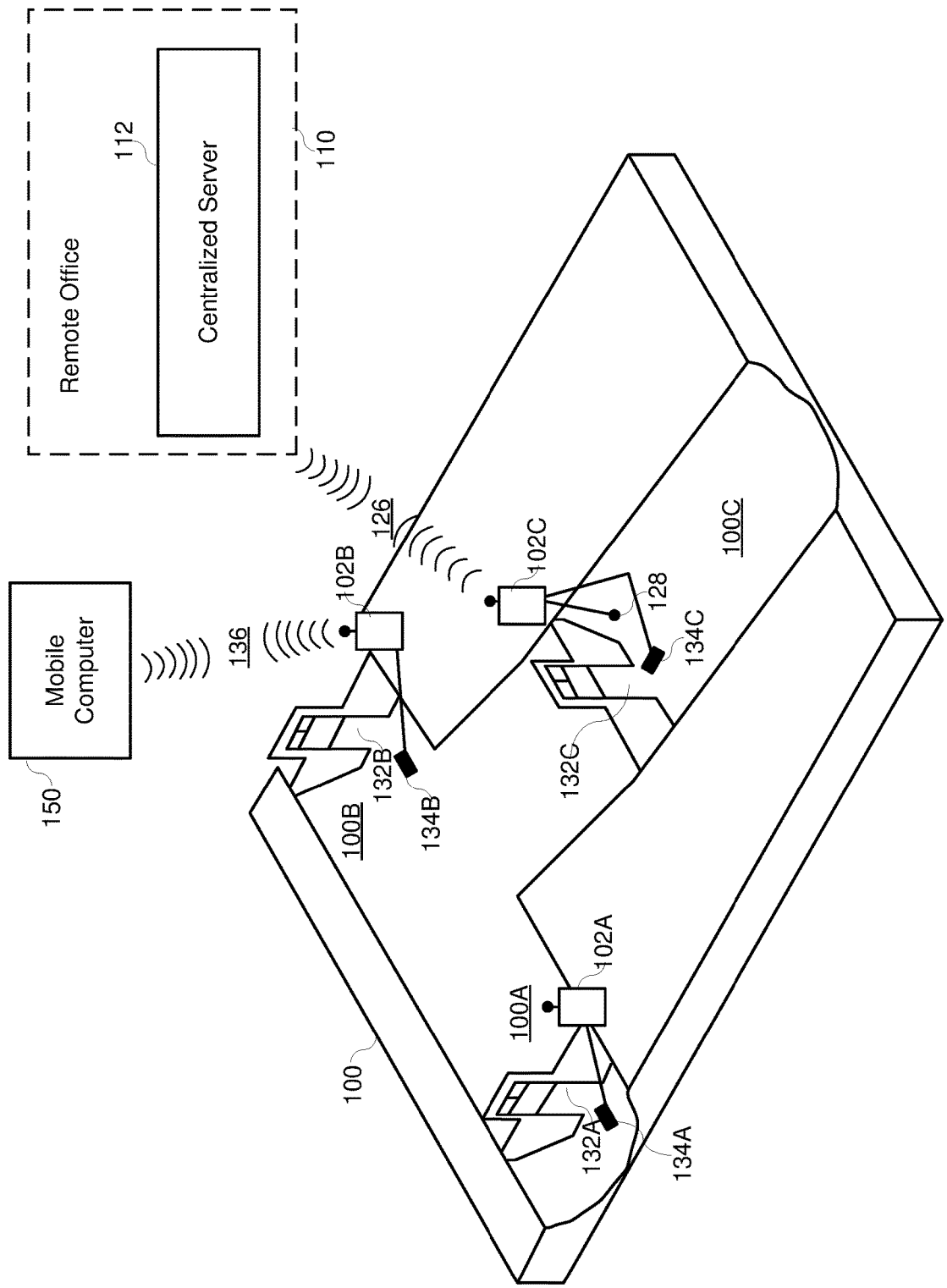
FIG. 1 illustrates a canal system and a water flow control system according to embodiments of the present disclosure

Water is the most important natural resource and has great social, economic, and environmental value. For example, production of electricity, paper, food, and clothes all depend on water. However, unpredictable rains and changing weather conditions may result in water scarcity. Additionally, changes in snowpack, sea level, and river flow may result in water scarcity. Accordingly, it is important to efficiently manage water resources.

Irrigations systems have long been used to distribute water and to mitigate the effects of water scarcity in a particular region. However, aged and imprecise irrigation water delivery systems at times result in a massive loss of water due to unnoticed channel seepage and blockage. Accurately monitoring and controlling the flow of water can be used to efficiently manage water resources.

Disclosed is a water network control, management, and automation system that improves the safety, reliability, and controllability of the flow of water. The disclosed water network control system may also be used to improve the control of power used to control water flow.

The disclosed control system may calculate water flow differential, provide overflow prevention, and monitor power usage of the system. The automation of water canal control systems described herein may be configured to simultaneously and precisely monitor and control both the flow of water and of power. Efficient and intelligent automation solutions for water conveyance applications may be used.

Water automation systems described herein may be designed with secure communications schemes that maintain the confidentiality of data while providing a reliable link between remote sites and a centralized control. The systems may also be designed to transfer information to portable devices using wireless communication such as a communication in accordance with the BLUETOOTH® communication protocol to provide an inexpensive and flexible human-machine interface (HMI) and diagnostic operator interface via portable laptop and tablet applications. This may provide a redundant operator display that may be separate from the local HMI and centralized supervisory control and data acquisition (SCADA) system. Systems as disclosed herein may be designed to exchange decision-making information among monitoring, control, and operator sites to automatically and precisely react to dynamic real-time variations in the water system.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Disclosed is a control system for a water network. The control system may be implemented using a control station and a plurality of remote monitoring stations. Each remote station comprises one or more flow controllers, one or more sensors communicatively coupled to a controller, and one or more canal gate actuators communicatively coupled to a controller. Each flow controller may consist of a programmable automation controller, a logical processor, and a wireless communicator that provides secure and reliable communication to the centralized control system as well as among monitoring and control sites. These features allow the water flow control system to make water flow monitoring and control efficient, economical, and predictable.

The embodiments described herein are drawn toward water networks. It should be noted that although certain specific embodiments described herein are drawn toward water canal networks, the water networks herein may include open channels, closed channels, and combinations thereof.

FIG. 1 illustrates a canal system 100. The canal system may be an open canal system with multiple canals or tributaries such as a T-shaped network of open channels 100. The illustrated system includes three canals 100A, 100B and 100C. The canals may be connected, allowing water to flow from channel to channel. According to one embodiment, canals 100A and 100B flow into canal 100C. In any case, the sum of the water flowing into the three canals 100A, 100B, and 100C should equal the sum of the water flowing out of the three canals 100A, 100B, and 100C, unless some anomaly is present, such as a leak, seepage, diversion, blockage, malfunctioning gate, evaporation, or the like.

Each canal 100A, 100B, and 100C of the canal system includes an adjustable gate 132A, 132B, 132C configured to adjust between open and closed positions so as to regulate a flow of water through each of the respective canals 100A, 100B, and 100C. Numerous styles and types of adjustable gates are available. According to various embodiments, adjustable gates may include an actuator which may include a motor or other mechanism for opening and closing (or adjusting) the gate based on an input from a controller.

Figure 2:
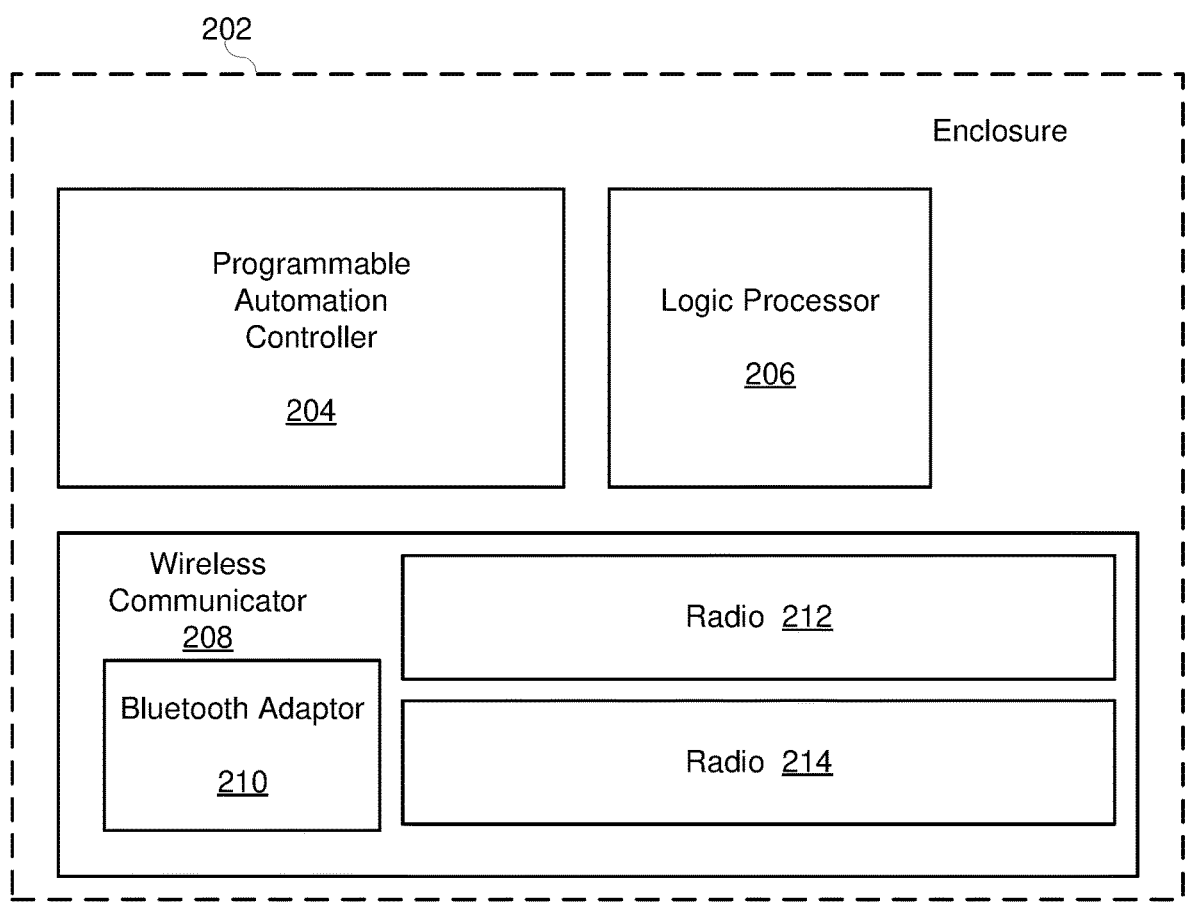
FIG. 2 illustrates a block diagram of a flow control station of a water flow control system.

As illustrated, each adjustable gate 132A, 132B, and 132C is in communication with an associated control station 102A, 102B, and 102C, each of which may include an automation controller (such as a programmable automation controller 204 of FIG. 2). Automation controllers may provide control signals to associated adjustable gates 132A, 132B, and 132C to control a position thereof, and hence control water flow through channels 100A, 100B, and 100C. Additionally, automation controllers may receive power information from associated adjustable gates 132A, 132B, and 132C related to power used to open and/or close the gate.

Each channel may further include a flow meter or a level sensor 134A, 134B, and 134C in communication with an associated automation controller, configured to provide an electrical signal related to water flow through the respective channel 100A, 100B, and 100C to the associated automation controller. Thus, each automation controller receives information related to the flow of water through its associated canal 100A, 100B, and 100C. Each automation controller may then calculate flow through its associated canal 100A, 100B, and 100C, compare the flow against predetermined flow thresholds, and adjust its associated gate 132A, 132B, and 132C accordingly. Each automation controller may be situated proximate to the associated adjustable gate 132A, 132B, and 132C and associated flow meter 134A, 134B, and 134C. Each combination of automation controller, adjustable gate, and flow meter may be considered to be a flow monitoring station.

Although illustrated are three canals and associated equipment and monitoring stations, it is envisioned that any number of canals, associated equipment, and monitoring stations may be used. For example, if canal 100B included two separate tributaries thereto, each tributary could include its own adjustable gate, flow meter, and monitoring station including automation controllers in place of or in addition to the adjustable gate 132B, flow meter 134B and monitoring station 102B. As discussed below, the automation controllers may each be in communication using, for example, a secure wireless network. Such communication may extend to an embodiment of more than three monitoring stations where each automation controller at each monitoring station may be in communication using, for example, a secure wireless network as illustrated and discussed herein.

Because flow monitoring stations are often installed in open fields, they may be exposed to extreme temperature conditions. Accordingly, rugged control hardware, such as those used in the power industry, may be used to improve safety, reliability, and performance of the water control system for the canal system 100. As indicated above, the water control system may use local processing (flow monitoring using signals from the flow meter 134A, 134B, and 134C and controlling the position of the adjustable gate 132A, 132B, and 132C, as discussed above) as well as communications-assisted, closed-loop, and wide-area control, as discussed in more detail hereinbelow. The water control system may display data using operator consoles or mobile consoles (such as tablet computers or smartphones), as further discussed hereinbelow.

The disclosed system allows for quantification in all monitored channels, including flow in smaller channels, such as irrigation turnouts. The discussed water flow control system may further calculate channel flow from Doppler-based flow sensors in larger channels. Additionally, the flow of smaller channels may be calculated using differential water level sensors as discussed below. The water flow control system is capable of real-time, intelligent control and management of the water network.

The water flow control systems disclosed herein may use rugged, high-speed automation controllers and dependable wireless communication between monitoring stations. Distributed communication devices and automation controllers may be used to provide closed-loop automation of the entire water distribution system. The water control system may also be capable of local and remote acquisition, storage, and display of energy consumption information. Data from real-time operations and infrastructure diagnostics and health information may be collected, analyzed, automatically acted upon, and presented to the operator.

The automation controllers may provide for continuous water flow rate monitoring, and may perform various calculations such as, for example differential head calculations using, for example, upstream and downstream sensors. As discussed herein, the control system may use automation controllers for local and remote monitoring and control for open channels. Further, the control system may include or may report to a centralized supervisory control and data acquisition (SCADA) system for operator control and report generation. Differential head may be calculated using the difference between upstream and downstream level sensors. Precise flow measurements allow for automated flow control of a user-defined target flow rate in the canal using programmable automation controllers. Target flow may refer to the required flow rate at turnout.

In control of a water canal system 100, adjustable gates may be used to manipulate the flow of water from the upstream side (the side with the higher water level) to the downstream side (the side with the lower water level). Adjustable gates may be operated in a manual mode or an automatic mode. In manual mode, the adjustable gates wait for a user command (which may be entered locally into an associated automation controller or remotely into another automation controller in network communication with the associated automation controller) to adjust their position. In automatic mode, an automation controller may monitor water system data, such as flow rates or water levels, and adjust the gate position according to programmed algorithms and predetermined set points. Similarly, open channel water flow on the downstream side may be controlled by manipulating the openings of adjustable gates. Overflow conditions may be avoided and/or monitored by calculating the channel flow differential to mitigate the risk of flooding by manipulating the water flow upstream.

As briefly mentioned above, the disclosed water flow control systems may include a plurality of adjustable gates equipped with electrical actuators. The actuators may be integrated via various digital and analog inputs and outputs—including gate status, gate position, gate control, and the like—to an I/O interface of an associated on-site automation controller. The on-site automation controller may have communications and logic capabilities. In certain embodiments, the automation controller conforms to the IEC 61131 standard for programmable controllers. One example of an automation controller that may be used is the Real Time Automation Controller (RTAC) SEL-3530 available from Schweitzer Engineering Laboratories, Inc. of Pullman, Wash. The automation controller may perform water monitoring using a flow sensor or differential level measurement and power monitoring using current transformers (CTs) and potential transformers (PTs) that are in communication with conductors carrying electrical power to, for example, the associated adjustable gate. The user may interact with the water flow control system in numerous modes via a centralized SCADA server, local operator interface terminal (01T) display, local annunciator light-emitting diodes (LEDs), manual switches, or the like. In certain embodiments, each station 102A, 102B, 102C is equipped with a wireless interface to provide on-site wireless monitoring via a mobile computing device. Examples of mobile computing devices include laptops, tablets, personal digital assistants (PDAs), smartphones, and the like. Examples of wireless interfaces include wireless local area networks (e.g., Wi-Fi® networks), wireless personal area networks (e.g., BLUETOOTH® networks), wireless wide area networks (e.g., cellular telephone networks), and the like. The monitoring station's wireless capability may reduce the time spent in the field by an operator by quickly providing simple monitoring of each station. Other possible improvements may include, for example, personnel comfort and safety during extreme temperatures and at dangerous locations because the field devices can be accessed wirelessly by a technician from inside a service vehicle.

Each monitoring station 102A, 102B, and 102C may also include one or more serial radios for providing SCADA and remote system access communications. One example of a serial radio that may be used is the SEL-3031 Serial Radio Transceiver, available from Schweitzer Engineering Laboratories, Inc. of Pullman Wash. In certain embodiments, the serial radios operate over an unlicensed frequency spectrum (e.g., 900 to 928 MHz) to provide secured data acquisition to the centralized control system and engineering workstation. The system redundantly logs data in the automation controller as well as in the centralized SCADA server. These data are easily retrieved and viewed.

The water flow control system may include a remote office 110 with a centralized server 112 used for centralized control and data storage. The remote office 110 may be in communication with one of the monitoring stations such as with the automation controller of monitoring station 102C. The communications between the remote office 110 and monitoring station 102C may be wired or, as illustrated, wireless 126. As described in detail herein, monitoring stations may include radios for wireless communication. One such radio may be used to communicate wirelessly with the remote office 110.

One or more of the monitoring stations, such as monitoring station 102B as illustrated, may be capable of wireless communication 136 with a mobile computer 150 as described herein.

The water flow control system may be configured to monitor the real-time flow rate of water through a channel using the differential head from upstream and downstream level sensors. Differential and overflow calculations may be used to provide an early warning of the poor health of instruments or the failure of a channel. The water flow control system may calculate and log flow on daily, monthly, and annual basis for historical water delivery trending. In this way the water flow control system provides more visibility into the application, which helps users in predicting and detecting the probable failure nodes. For example, the trends may reveal that a channel is in need of widening or that a gate needs replacing. Additionally, the system can reveal trends that may indicate where changes to the system should be made.

Monitoring stations may receive signals from additional sensors. For example, monitoring station 102C receives pH signal information from pH sensor 128. Thus, an automation controller may be configured to receive and monitor pH using signals from the pH sensor. Other sensors may also be used. Although FIG. 1 illustrates three stations, multiple stations may be used. As discussed below, communication among the stations, regardless of the number of stations, may be in a ring topology.

FIG. 2 illustrates a block diagram of a monitoring station 202 such as one of the monitoring stations 102A, 102B, and 102C illustrated in FIG. 1. The illustrated flow monitoring station 202 resides within an enclosure. The illustrated monitoring station 202 includes an automation controller, illustrated as a programmable automation controller 204, a logic processor 206, and a wireless communicator 208. The wireless communicator may comprise a BLUETOOTH® adapter 210 and a pair of serial radios 212, 214. The BLUETOOTH® adapter 210 may be an adapter such as the SEL-2924 or SEL-2925 BLUETOOTH® adapters available from Schweitzer Engineering Laboratories, Inc. of Pullman, Wash. Programmable automation controller 204 performs water and power monitoring and control. One example of a programmable automation controller that may be used is the SEL-2411 Programmable Automation Controller available from Schweitzer Engineering Laboratories, Inc. of Pullman, Wash. Logical processor 204 monitors sensor signals and provides alarms. Wireless communicator 208 transfers data and/or command responses with remote terminal and with a central server.

In certain embodiments, the system may include dual-layer redundancy at the hardware and software levels, which ensures fail-safe operations. Multi-featured devices may support the flexibility of hardware and software redundancy to accomplish specific tasks in numerous ways, thereby increasing the overall reliability of the control system. Data acquisition redundancy may be provided by a primary-level sensor and a secondary-level sensor. Data display redundancy may be provided by operator interface terminal (OIT), human-machine interface (HMI), front-panel annunciator LEDs, and mobile device (e.g., tablet or smartphone) interface. Data storage redundancy may be provided through both the on-site automation controller and a remote, centralized server. Alarm redundancy may be provided through OIT, SCADA, front-panel annunciator LEDs, mobile phone multimedia messaging service (MMS), or email.

The on-site logic processor 206 may be configured to receive signals from a flow meter (such as flow meter 134a, 134B, or 134C of FIG. 1), which may be provided as an analog signal. The flow meter may be in the form of a level sensor, ultrasonic flow meter (such as a Doppler flow meter), or the like. The logic processor may be configured to use such analog signals to calculate an average flow rate. The flow rate may be averaged within a fixed time interval. Using the calculated flow rate data, a flow error may be identified. Flow error is calculated based on the difference between the calculated flow rate and a target flow rate.

The on-site logic processor 206 may also identify a gate error from the flow rate data. The gate error may represent the difference between the current gate position and target gate position, and is linearly related to the flow error. Under ideal circumstances, the gate error and flow error would be zero, except when a gate is changing position. However, due to allowable tolerances in mechanical devices such as adjustable gates, the gate error is typically near zero. While in automatic operation mode, a non-zero flow error results in the automatically commanded adjustment of gate positions. More discussion of gate control and automation is included below in association with FIG. 7.

It should be noted that although FIG. 2 illustrates that each monitoring station 202 includes a logic processor 206 and an automation controller 204, the logic processor 206 may be incorporated into a single unit with the automation controller 204. Further, the automation controller 204 may perform the calculations described herein.

As discussed above, FIG. 2 illustrates a single monitoring station where the water monitoring systems disclosed herein may include several monitoring stations in communication. Indeed, the illustrated single monitoring station includes a wireless communicator 208 with two radios 212 and 214 for network communication with other monitoring stations. Modern information and control technology (ICT) systems rely extensively on communication for the discrete elements of the control system to collectively accomplish specific tasks. Because of the critical functions performed by control systems, great care must be taken in regard to security, reliability, dependability, and availability while designing the communications scheme. The disclosed water flow control system provides redundant or backup communication for SCADA data using multiple channels on radios. The stations communicate in a dual-ring topology, discussed below.

Figure 3:
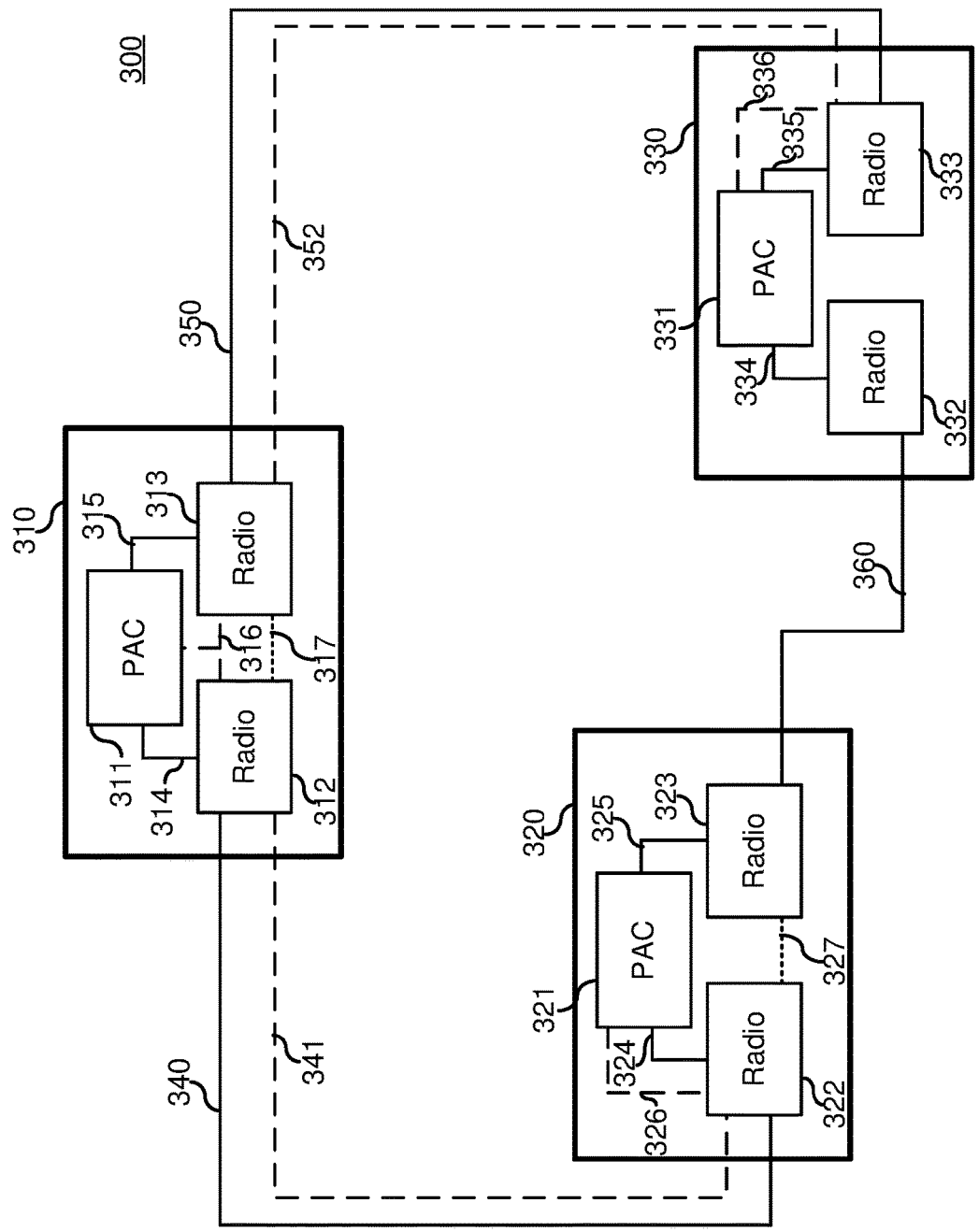
FIG. 3 is a block diagram of a logical communications topology for a water flow control system according to embodiments of the present disclosure.

FIG. 3 illustrates a block diagram of a communications topology for a water flow control system 300. The control system 300 comprises a flow control station 310 and flow monitoring stations 320, 330. It should be noted that although station 310 is designated as the control station, any of the stations may be designated as the control station, with the automation controller of the control station being the control automation controller. Each of stations 310, 320, and 330 comprises a programmable automation controller (e.g., PAC 311, PAC 321, and PAC 331) and a communication device which may include a pair of co-located radios (e.g., radios 312, 313, 322, 323, 332, and 333). In each station, the automation controller 311, 321, and 331 communicates with automation controllers at other sites via each of the associated radios. Thus, the associated radios facilitate communications between automation controllers. Communications between automation controllers may correspond with one or more communications protocols as described in more detail below. The associated radios may facilitate communications between automation controllers corresponding with the one or more communications protocols. In certain embodiments, one of the communication protocols between automation controllers may include a high-speed, secure, point-to-point communication protocol such as the MIRRORED BITS® protocol (available on several devices provided by Schweitzer Engineering Laboratories, Inc. of Pullman, Wash.). The automation controller to radio communication paths are represented by lines 314, 315, 324, 325, 334, and 335. Communications among automation controllers corresponding with this protocol are represented by paths 340, 350, and 360.

As mentioned above, associated communications devices (which may be radios) facilitate communications between automation controllers, where the communication between automation controllers may comply with certain protocols. Automation controllers may use one or more communications channels, each associated with a particular communications protocol. Communications devices may facilitate such communications by receiving the communications from the automation controllers and transmitting the communications to another communications device, which in turn transmits the communications to another automation controller.

In several embodiments, each of the stations 310, 320, and 330 may be a monitoring station, and one of the monitoring stations may be deemed a control station 310. Flow control station 310 performs SCADA communication with each of flow monitoring stations 320, 330 using a communication protocol. Such communication protocol may be a protocol used by SCADA systems such as, for example Modbus, RP-570, Profibus, DNP3, and the like. The SCADA communication paths between automation controllers (facilitated by radios) at different control or monitoring stations are represented by lines 341 and 352. An automation controller may communicate using this communication protocol via a radio to send/receive SCADA commands or responses, represented by lines 316, 326, 336.

Although certain communications protocols are discussed above, the automation controllers may be in communication, facilitated by the radios, using a variety of communications protocols. Indeed, the automation controllers may be in communication using a plurality of communications protocols.

Radio pairs may synchronize with each other to avoid interference. Radio synchronization connections are represented by lines 317 and 327. Radios 332 and 333 may be synchronized over 350 and 360 which are also passing the first protocol between devices via the radios. The serial radios used in the water flow control system may be selected to provide low cost, reliable and secure communication. Each serial radio may include three serial ports that support three different simultaneous connections and protocols to operate simultaneously. Each pair of serial radios may be coordinated to transmit and received in a synchronized fashion. For example, the radios may be synchronized using another communications protocol to hop frequencies, transmit, and receive at the same times, so none of the collocated radios will transmit while other collocated radios are receiving signals. One protocol for such synchronization includes HOP-SYNC™ technology available from Schweitzer Engineering Laboratories, Inc. of Pullman, Wash. By using a synchronization protocol such as HOP-SYNC™ technology, two radios may be collocated and may communicate back-to-back and exchange data as repeaters without much interference. These radios move information such as water channel flow information, power information, control signals, notifications, and the like among multiple stations 310, 320, 330 in order to, for example, calculate channel flow differential in irrigation water applications. Two radios at each station may be configured to provide comprehensive real-time communications for peer-to-peer automation and client server communications with a SCADA master regardless of distance and terrain between the SCADA location and the remote stations.

As mentioned above, each of the serial radios 312, 313, 322, 323, 332, 333 may include three serial links multiplexed over one radio channel. Each port of the three serial ports can be configured to facilitate communications according to a different protocol. These radios, as illustrated, are installed in pairs at each station. According to one particular embodiment, following the illustrations of FIGS. 3 and 4, a first port is used to facilitate low-speed SCADA control and monitoring using DNP3 protocol to an intelligent electronic device (IED) port and second port is used to facilitate inter-station high-speed peer-to-peer communication protocol such as MIRRORED BITS® Communications protocol to another IED port. These high-speed peer-to-peer communications links may be configured to simultaneously transmit data both directions between the radios, such as with the MIRRORED BITS® Communications protocol.

The illustrated communication topology is a dual-ring communication topology. The dual-ring communication allows independent, rapid, redundant peer-to-peer communication for innovative automation and closed-loop algorithms while also supporting centralized SCADA and engineering access. The first ring provides peer-to-peer communication among various stations. In certain embodiments, the first ring uses a high-speed, peer-to-peer communication protocol such as the MIRRORED BITS® communications protocol to provide a low latency, low cost, and simple direct data exchange. An important feature of this peer-to-peer communications is that it may be configured to constantly send data both directions around the ring. The first ring assures fast, redundant delivery of all information and assures correct operation even in the event of a device or link failure. The second ring serves as a dedicated channel for SCADA communication. In certain embodiments, the second ring uses the DNP3 protocol to provide low message overhead, event buffering, and time-stamping of data records.

The dual-ring topology provides multiple channels between stations for more reliable communication and no single point of failure. Additionally, every station in the dual-ring topology has equal access to communication resources, resulting in a more flexible network and more sophisticated automation. The data load between stations may be shared over multiple channels for consistently enhanced performance and data flow balancing.

In one embodiment, the dual-ring topology is configured to provide simultaneous measurements at different stations. Such an exchange of flow data from multiple stations allows for calculation of channel flow differential. Channel flow differential calculations detect a mismatched flow rate between interconnected open channels to help in the early detection of certain anomalies, such as channel leakage, seepage, diversion, blockage, malfunctioning gate, evaporation, and the like.

As IEDs have multiple ports that support communication such as high-speed peer-to-peer communication, data coming from one direction into a serial port is often passed through and published out of a second similar port. In this way, the IEDs and radios perform high speed data repeating. In case of radio repeater sites, PORT 3 may be interconnected on the local radio pair and perform conventional repeating of the received protocol messages among radios without passing through the IEDs. This connection between these ports on these radios may also be used for the radio synchronization described above for minimum interference between the radios. This synchronization allows two radios to synchronize publications to remote radios simultaneously and therefore prevent the radios from interfering with each other. Such synchronization may provide continuous bandwidth at a low latency compared to using another separate radio as a repeater and attempting to communicate through simultaneous receipts and publications.

Such radio synchronization may synchronize all the radios in the network to one master radio, to the minimize interference and to maximize the radio performance. The multiple channels between stations provide flexible topologies and the use of more than one protocol between the central SCADA and remote stations as well as between stations. The ring topology possible with the serial radios and high-speed peer-to-per communication may be used for automatic data flow redundancy for more reliable communication. The ring or linear pass through topology possible with the serial radio and SCADA protocols, such as DNP, may be used to provide client server communications to multiple stations far away from the central station. This allows simple and inexpensive site-to-site path studies and installation and communications with sites that do not have a direct line of sight to the central station. The dual-ring topology described herein allows for redundant client server connections via fast failover at the RTAC client if a radio link fails. This provides data flow redundancy of SCADA protocols for more reliable communication simultaneous with dual direction MIRRORED BITS® communications over the other channel.

The illustrated and described dual-ring communication topology can be used to provide data flow redundancy of SCADA protocols for more reliable communication simultaneous with high-speed peer-to-peer communication over the other channel. Such fully redundant dual-ring topology supports constant redundant client server connections or failover connections via fast failover if a radio link fails. This provides data flow redundancy of SCADA protocols for more reliable communication. The communication network may be configured such that every station 310, 320, 330 has equal access to the resources.

As discussed, the illustrated serial radios may be configured to communicate in linear pass through or ring-topology to provide bidirectional communication over multiple channels using the high-speed peer-to-peer communications channels. These bidirectional communication channels permit communications between devices at each station in order to exchange data to calculate the channel flow differential through inter-connected network of open channels in the field.

Channel flow differential can be used for early detection of open channel blockage and channel leakage or other anomalies as listed herein. Channel flow differential can also be stored for creation, storage, and trending of typical channel water loss data in order to permit future seasonal comparisons to detect abnormal loss. Channel flow differential may be used for detection of abnormal water loss to alert end users to channel failure and trigger condition based maintenance of channels and gates. Additionally, channel flow differential may be used to improve troubleshooting, diagnostic calculations, reduce calculation time as data is shared between stations over multiple channels, and prevent the over-flooding of the open channel by generating alarms for mismatched water flow among inter-connected open channels. Such information may be used to reduce damage to gate structures, motors, and crops. Channel flow differential may also improve gate position selection by using both local gate head differential and the changes in flow rate at the upstream intake point and turnouts. Knowledge of the changing upstream flow rates permits prediction and preparation of changes to flow rate at the local gate. Upstream flow rates may be calculated using additional flow sensors in communication with automation controllers.

The serial radios 312, 313, 322, 323, 332, 333 may be configured to work in a linear pass through or ring topology with one master sending the synchronize signal to synchronize all the radios in the network.

In certain embodiments, all transmissions between radios at different sites may be encrypted. In one embodiment, the radios using multiple channels can be set to encrypt all the data and transfer it at a maximum baud rate of 9600 bps or a maximum baud rate of 19200 bps without encryption.

Figure 4:
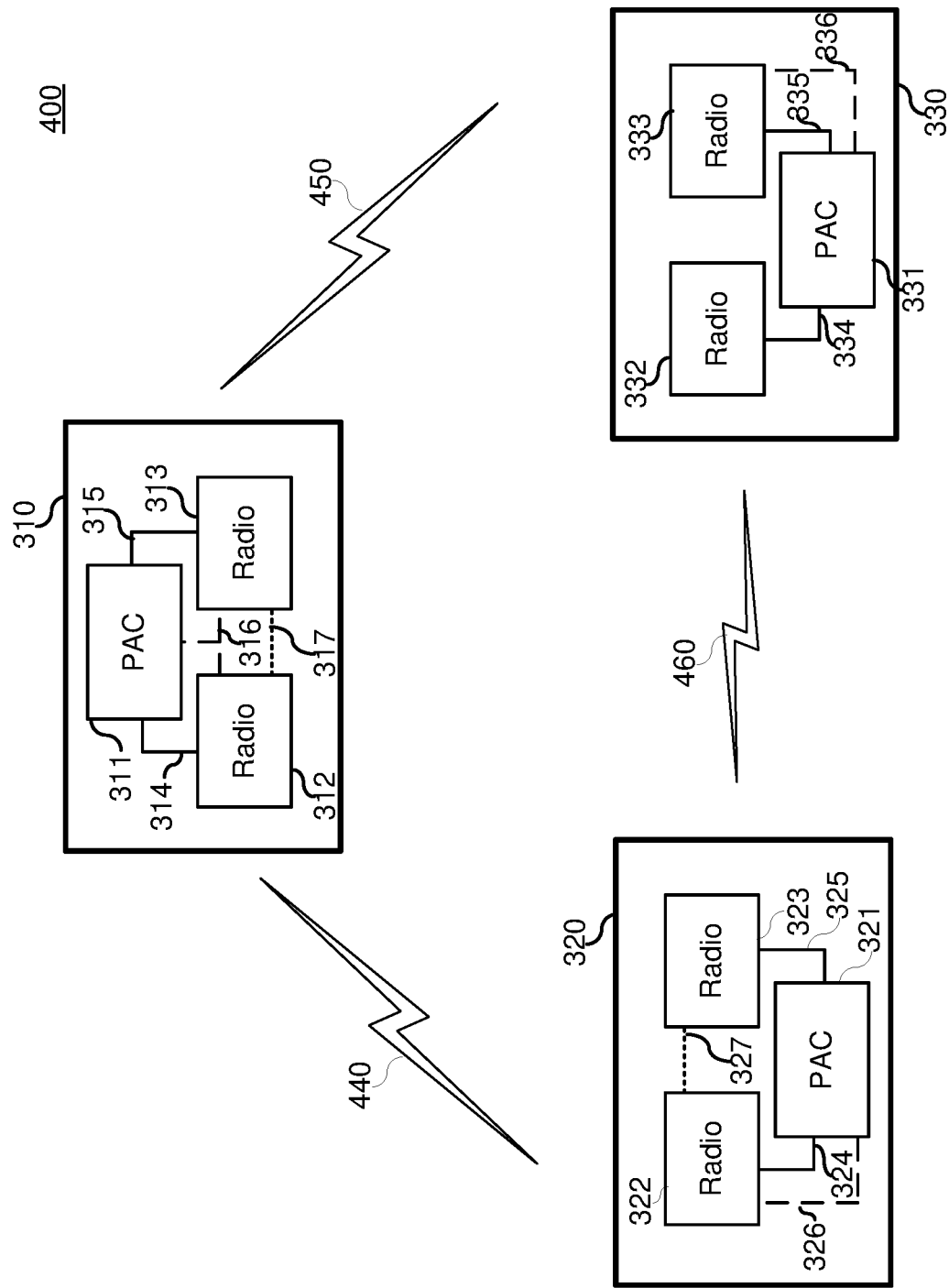
FIG. 4 is a block diagram of a physical communications network in a water flow control system according to embodiments of the present disclosure.

FIG. 4 illustrates a block a diagram of a communications network in a water flow control system according to embodiments of the present disclosure. Water flow control system 400 is similar to water control system 300 and comprises a flow control station 310 and flow monitoring stations 320, 330. Control station 310 communicates with monitoring station 320 via radio link 440 and with monitoring station 330 via radio link 450. Monitoring station 320 communicates with monitoring station 330 via radio link 460. The stations and radio links of FIG. 4 implement the dual-ring communication topology described above with regards to FIG. 3.

The automation controllers 311, 321, 331 may be configured to provide high-speed and precise computation of flow rates and flow control algorithms. Flow rates may be calculated by using flow information provided by the flow monitors such as Doppler-based sensors or by using differential water level sensors. As irrigation delivery channels may be small in size, making it hard to install Doppler-based sensors, upstream and downstream water level sensors may be used to achieve the required precision in flow measurement. Where upstream/downstream water level sensors are used, the automatic controller may calculate flow based on differential head by using a flow equation.

Flow rates may be calculated using, for example, Equation 1:

$$Q = C_d * A * C_c * H^{0.5} \qquad \text{Eq. 1}$$

where:
Q is the flow rate (in cubic feet per second (CPS));
$C_d$ is the channel discharge coefficient;
A is the orifice area in square feet;
$C_c$ is the equation constant for the particular type of site or channel; and,
H is the difference between upstream and downstream levels.
The term $H^{0.5}$ is the head differential in feet for submerged flow.

The orifice area A may be determined using equation 2:

$$A = OW * OH \qquad \text{Eq. 2}$$

where:
OW is the orifice width in feet; and,
OH is the opening height in feet.
In automated control systems, the orifice width may be assigned through OIT or SCADA and the opening height may be measured by a string pot or potentiometer.

The corresponding flow computation logic may be programmed into the automation controller. An example of computer code used to compute flow rate is shown in FIG. 5, where:
Diff_Head is the differential head;
AVG_US_LEVEL is the average level from the upstream side;
AVG_DS_LEVEL is the average level from the downstream side;
Dis_Coeff is the discharge coefficient;
GATE_POS is the present opening of the gate;
GATE WIDTH is the width of the gate;
AL_Diff is the low differential head alarm.

Calculated flow rate data may be used in detecting channel seepage and blockage, and other anomalies as mentioned herein. As the sum of water flowing into a network of open channels should be equal to the sum of water flowing out of the network of channels, channel blockage, seepage, diversion, excess evaporation, failure, gate misoperation, or the like is indicated when the water flow rate is not equal. When unequal water flow rates are detected, the water flow control system generates an alarm indicating that such an anomaly has occurred.

Although the embodiments described above include only three stations, many stations may be used. In the embodiments where additional stations are used, a ring communication topology may be preserved. For example, turning to FIG. 3, an additional station may be used between station 310 and station 330. As with the illustrated stations, the additional station may include an automation controller and a pair of radios. The pair of radios may communicate with each other by a radio synchronization communication protocol. The pair of radios may communicate with their associated automation controller, and may also facilitate communications with automation controllers using radios of stations 310 and 330 using two communication paths.

Figure 6:
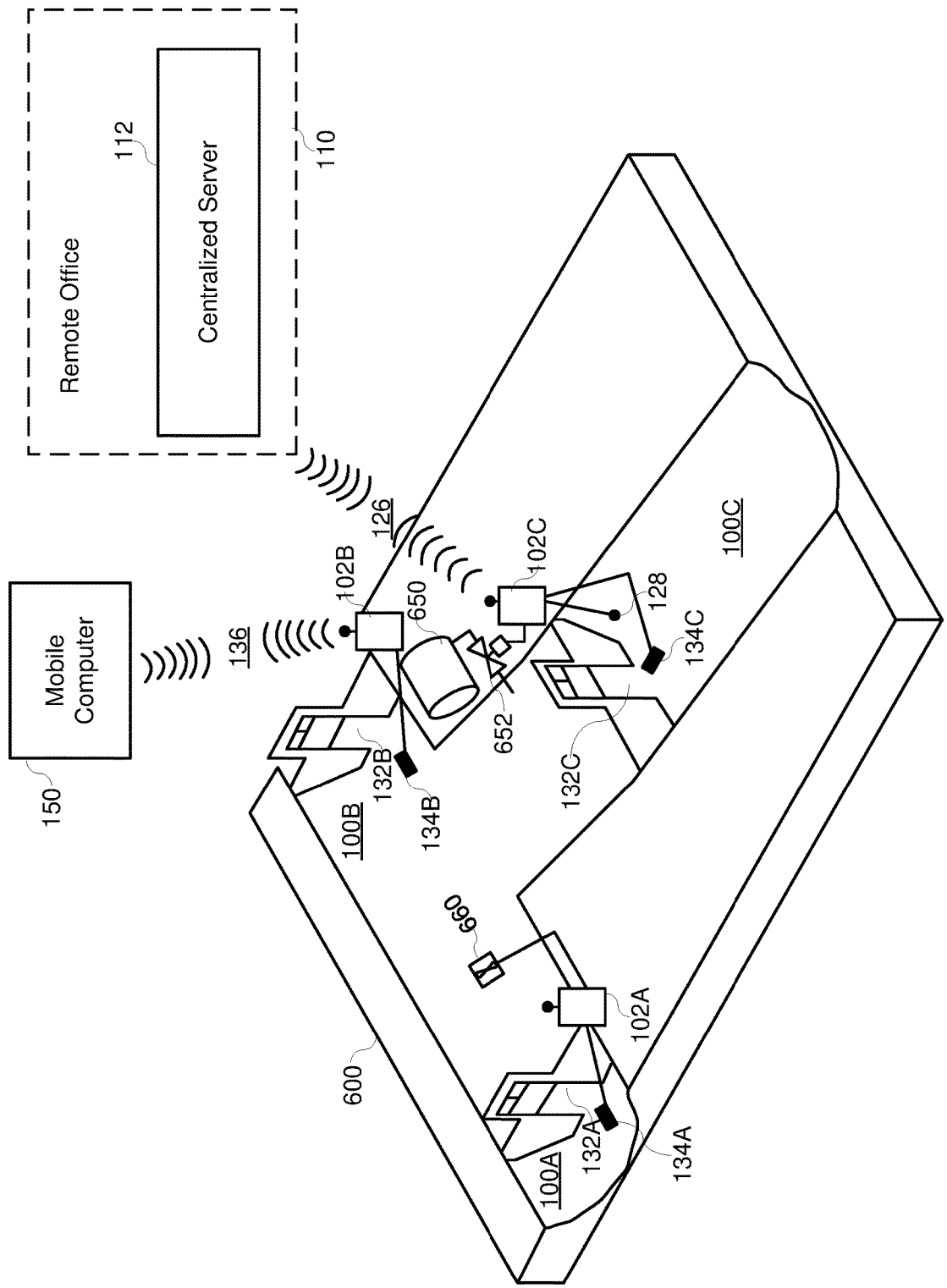
FIG. 6 illustrates a canal system and a water flow control system according to embodiments of the present disclosure.

FIG. 6 illustrates a canal system 600 that includes a water flow control system according to various embodiments. Canal 100C includes a pH sensor 128 in communication with monitoring station 102C. The pH sensor 128 may provide signals corresponding to a pH reading of the water at the sensor. As described above, monitoring station 102C may include an automation controller receiving the signals and undertaking automation and/or control operations based thereon. Monitoring station 102C may be configured to communicate the pH readings to other monitoring and/or monitoring stations 102B, 102C. The system may be configured to undertake control operations based on the pH signals to adjust a pH to a predetermined setpoint. For example, gates may be adjusted, components may be added, or the like.

FIG. 6 further illustrates a storage vessel 650 for storing an additive that may be added to the canal system 600 using, for example, a valve 652. Valve 652 may be a control valve in communication with monitoring station 102C. An automation controller of monitoring station 102C may be configured to signal the control valve 652 to open and/or close. Such control may be based on a user input, time-of-day, a sensor reading, or the like. In one embodiment, vessel 650 is configured to store a liquid additive. According to other embodiments, vessel 650 may be configured to store solid, powdered, aqueous, gaseous, or other additives in other phases. Appropriate control equipment or valves may then replace control valve 652 as needed.

In one example, a farmer with fields downstream of monitoring station 102C may be capable of logging in to the control system using, for example, a mobile computer 150. The storage vessel 650 may store fertilizer that the farmer requires to be added to the certain fields. The farmer may send a request that control valve be opened to add the fertilizer to canal 100C.

In another example, the pH meter may be used to detect that the pH exceeds a certain setpoint. Storage vessel may contain an acid used to control the pH level downward. Monitoring station 102C may then either share a signal or the pH value with the other automation controllers, and/or signal for opening of valve 652, thus controlling for a pH of the water in the canals. In one embodiment, the pH meter is downstream of the storage vessel input. In another embodiment, pH meter is upstream of the storage vessel input.

Other hardware sensors may similarly be used in the control system. For example, temperature (air and/or water), rainfall sensors, soil water sensors, oxygen sensors, on-plant sensors, and the like may provide signals to the control system.

Furthermore, FIG. 6 illustrates a micro-hydro-generation turbine 660 in canal channel 100A. Turbine 660 may provide electrical power to the monitoring station 102A. Turbine 660 may further provide electrical power to the adjustable gate 132A for making needed adjustments. Such turbines may result in the monitoring stations being self-sustainable and possible providing electric power back to an electric power supply such as a utility grid.

Figure 7:
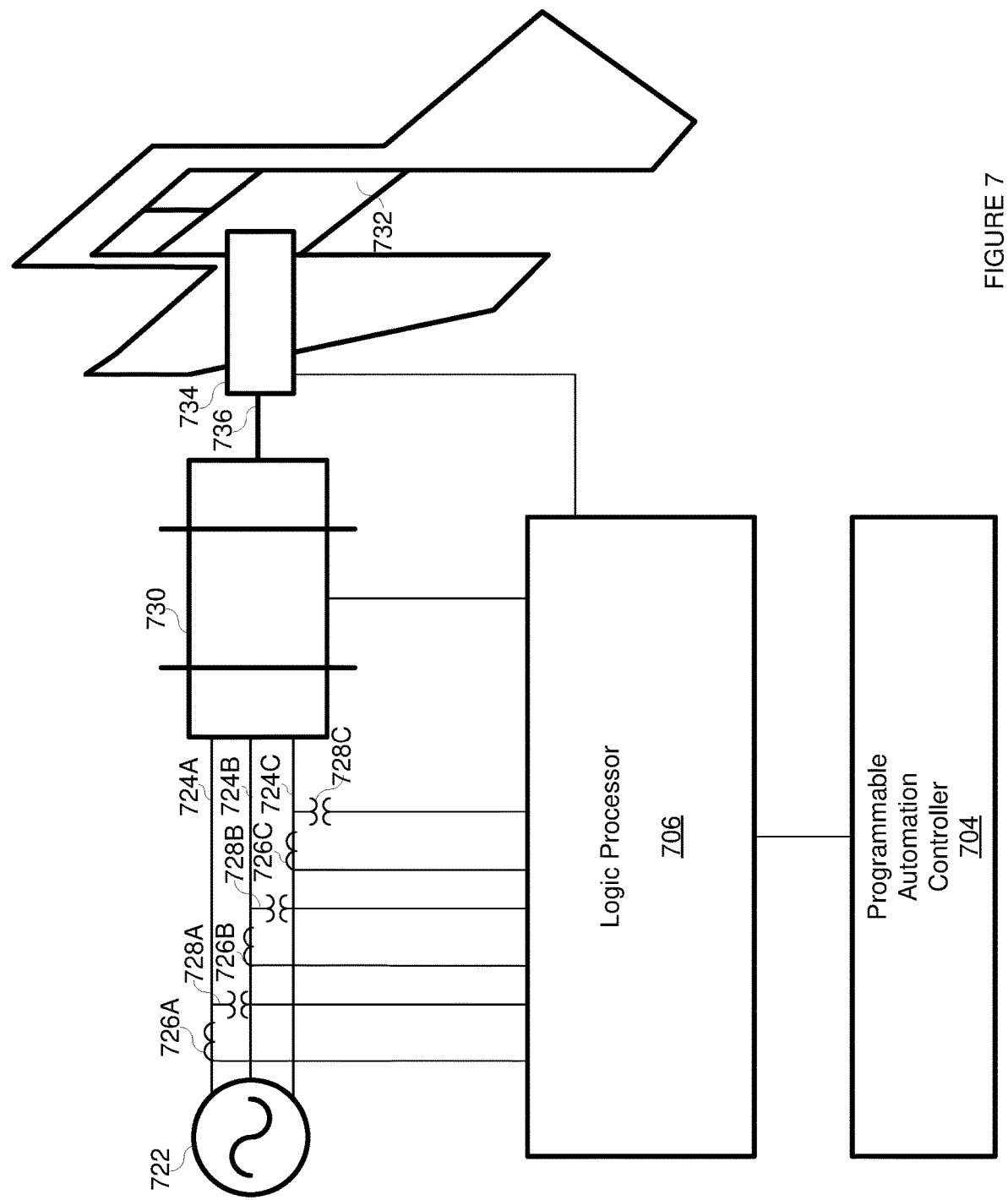
FIG. 7 is a block diagram showing monitoring and control of an adjustable gate according to embodiments of the present disclosure.

FIG. 7 illustrates a block diagram of an adjustable gate 732 and an automation controller 704 in communication therewith. As discussed above, an adjustable gate 732 may be adjustable using an actuator. A variety of gate actuators, including electrical, hydraulic, and pneumatic actuators, may be used to adjust gate position. In certain embodiments, electrical actuators may be used with irrigation gates because they require less maintenance and are more reliable than hydraulic and pneumatic actuators. The illustrated system shows an electric actuator which may include an electric motor 730 and a transmission 734 with a drive 736 there between. The transmission may be in contact with the adjustable gate 732 for adjustment thereof, and be powered from the drive 736 of the motor 730.

Water delivery depends largely on reliable power delivery to such actuators. Interruptions in power delivery deteriorate the delivery of water to the fields because flow adjustments cannot be made due to electric power not being available to the actuators for adjustment of gate positions. The systems according to the present disclosure include the logic for metering power using various CTs and PTs. Various alarms related to power, such as power failure, phase failure, and overcurrent detection, are included to make the application safer and more reliable and to protect equipment from damage. For example, loss of a single phase to a three phase motor may result in excessive heat in the motor windings prior to the thermal overload detection since it is drawing all its current from the remaining two lines. Also, attempting to start a three phase motor on single phase may cause the motor to draw locked-rotor current and the motor will not start. Accordingly, the disclosed water flow control system also monitors power delivery to the gate actuators and provides power related alarms to a user.

As illustrated in FIG. 7, a three-phase motor 730 may be used to adjust the position of the adjustable gate 732. The three-phase motor 730 is powered using electric power from three-phase electric power source 722. Three-phase electric power source may be a three-phase generator, power available from a utility, power available from a hydro-generation unit, or the like. Three-phase electric power source 722 may deliver electric power using three phase conductors 724A, 724B, and 724C. Electric current and voltage signals from each of the three phase conductors 724A, 724B, and 724C may be supplied to a logic processor 706 using CTs 726A, 726B, and 726C as well as PTs 728A, 728B, and 728C. Logic processor 706 may be in communication with the electric motor 730 to supply command signals thereto. Logic processor 706 may further be in communication with the transmission 734 to obtain signals related to the adjustable gate position.

The logic processor 706 may use the current and voltage signals to determine electric power used by the motor 730 and provide electric motor protection depending on the power used thereby. Further, as discussed above, logic processor 706 may determine availability of all three phases of electric power before signaling the electric motor to operate. Logic processor 706 may monitor electric power used by the motor 730 in order to determine problems with the motor 730, transmission 734, and/or adjustable gate. For example, if the electric power required for certain adjustments is higher than historical, then a problem may have occurred such as, for example, a stuck gate, or malfunctioning transmission. The logic processor 706 may then be configured to cease operation of the motor, and provide a signal to an operator as discussed in further detail herein. Such determination and commands may be made by an automation controller 704 instead of by logic processor 706. As described herein, the automation controller 704 and the logic processor 706 may be incorporated into the same physical device.

Furthermore, such monitoring may enhance maintenance operations of the motor 730, transmission 734, and/or gate 732. As mentioned above, power usage data may be monitored and recorded. The logic processor 706 and/or the automation controller 704 may be configured to monitor the power used by the motor. As the power used increases over time, the logic processor 706 and/or the automation controller 704 may be configured to notify personnel of necessary maintenance. In one embodiment, once power usage exceeds a predetermined threshold, the logic processor 706 and/or the automation controller 704 may be configured to notify personnel of necessary maintenance. As discussed above, such notifications may be made using the OIT, HMI, front-panel annunciator LEDs, mobile device interface, email, or the like. Indeed, one automation controller may be configured to send such notifications to operators using another automation controller using the communications network disclosed herein.

Thus, the water flow control system may also continuously monitor the power drawn by the actuators and provides the opportunity to predict or detect mechanical problems. Also, unexpected continuous power consumption by a motor may be used to create a malfunction alarm. Energy monitoring at all stations may help managers calculate the costs associated with water delivery operations.

A control automation controller may be configured to monitor actuator power usage, and optimize system power usage based thereon. For example, if a particular water flow target is possible using a single adjustable gate or multiple adjustable gates, the controller may be configured to select the operation using a single adjustable gate. Using past power usage data, the controller may be configured to calculate the power used to undertake an operation using various combinations of adjustable gates, and select the combination that would use the least amount of power to undertake the operation. Such optimization may further reduce wear and tear on mechanical parts.

Thus, the systems described herein may include a closed-loop control operation to manage the flow of water and use of power. The systems disclosed herein may be configured to optimize the power used while maintaining desired flow at all points.

In various embodiments, certain water delivery points may require predetermined flow rates at predetermined times. Thus, the control automation controller or the monitoring station automation controllers may be configured to modify associated adjustable gate positions after fixed preprogrammed intervals to achieve the target flow rates. Each change notification may be sent to a SCADA system or irrigation authorities and/or a user.

In several embodiments, the system may make information therefrom available to certain users via a secured website. As illustrated in FIG. 1, automation controller at station 102C may be in communication with a remote office 110 and a centralized server 112. The remote office and/or centralized server may make information from any or all of the automation controllers available on a secured website. Such system data may be accessed by certain users, and provide users an ability to log in with proper credentials and vary the water delivery based on their requirements. To counter the impact of increased cost due to stations with time-of-use-based charging methods, water flow can be scheduled during off-peak times. Such requests may require approval by a user or system with higher or different credentials than the user making the request.

Further, such data may be made available to water system operators. Maintenance activities may then be scheduled when certain equipment is not expected to be in service. Data may be used by water system operators to make decisions based on statistical analysis therefrom.

Water flow calculations at the upstream and downstream sides, as mentioned hereinabove, can be used to support delivery and contract comparisons. Such a system may be used even in situations where the upstream water flow is controlled by a separate operator or owner. Water flow calculations at every gate may be used to support validation of water delivery into and through the system and the comparison with contractual obligations.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A water flow control system comprising:
   a plurality of adjustable gates, wherein each adjustable gate is adjustable to control the flow of water within one of a plurality of water channels;
   a plurality of flow sensors, wherein each flow sensor measures flow data of one of the plurality of water channels;
   a plurality of flow monitoring stations, wherein each flow monitoring station is associated with one of the plurality of water channels to receive flow data from an associated flow sensor and transmit control signals to an associated adjustable gate,
      wherein one of the flow monitoring stations serves as a flow control station to receive flow data from and transmit commands to others of the plurality of flow monitoring stations; and
   a dual-ring redundant communications network supporting two different protocols, comprising:
      a first communication ring that connects each of the plurality of flow monitoring stations in a ring topology that facilitates communication via a bi-directional peer-to-peer communications protocol, and
      a second communication ring that enables the flow control station to transmit commands to others of the plurality of flow monitoring stations via centralized client-server communications.

2. The system of claim 1, wherein each of the plurality of flow monitoring stations comprises:
   a first radio with a first peer-to-peer communication channel and a first client server communication channel for communication via both the first and second communication rings in a first direction on the dual-ring redundant communications network; and
   a second radio with a second peer-to-peer communication channel and a second client-server communication channel for communication via both the first and second communication rings in a second direction on the dual-ring redundant communications network.

3. The system of claim 1, wherein the centralized client-server communications utilize a DNP3 protocol to support SCADA communications.

4. A water flow control system, comprising:
   a flow control station including:
      a control automation controller, and
      a control communications device with a plurality of communication ports to facilitate communication via at least a peer-to-peer communication protocol and via client-server communications;
   a first flow monitoring station including:
      a first station communications device with a plurality of communication ports to facilitate communication via at least the peer-to-peer communication protocol and via the client-server communications,
a first flow sensor to measure water flow within a first water channel and transmit flow data to the flow control station via the first station communications device, and
a first adjustable water flow control device to control water flow within the first water channel based on control signals received from the flow control station;
a second flow monitoring station including:
a second station communications device with a plurality of communication ports to facilitate communication via at least the peer-to-peer communication protocol and via the client-server communications,
a second flow sensor to measure water flow within a second water channel and transmit flow data to the flow control station via the second station communications device, and
a second adjustable water flow control device to control water flow within the second water channel based on control signals received from the flow control station; and
a dual-ring communications network providing redundant communication channels for peer-to-peer and centralized client-server communications comprising:
peer-to-peer communications channels operating in a ring topology to facilitate bi-directional peer-to-peer communication between each of the control communications device, the first station communications device, and the second station communications device, and
client-server communications channels facilitating client-server communication from the control communication device to each of the first station communications device and the second station communications device.

5. The system of claim 4, wherein the control automation controller is configured to:
receive the flow data from the first flow sensor,
receive the flow data from the second flow sensor, and
transmit a control signal to the first or second flow monitoring stations based on the received flow data from the first and second flow sensors.

6. The system of claim 5, wherein the control automation controller is configured to calculate a flow differential based on the received flow data from the first and second flow sensors.

7. The system of claim 6, wherein the control automation controller is further configured to detect an anomaly based on the calculated flow differential.

8. The system of claim 4, wherein the flow control station further comprises:
a third flow sensor in communication with a third channel; and
a third adjustable water flow control device associated with the third channel,
wherein the control automation controller is in communication with the third flow sensor and the third adjustable water flow control device.

9. The system of claim 8, wherein the control automation controller is configured to calculate flow differentials based on flow data from the third flow sensor and the received flow data from the first and second flow sensor.

10. The system of claim 4, wherein the control communications device comprises:

a first radio with a first peer-to-peer communication channel and a first client-server communication channel for communication in a first direction on the dual-ring communications network; and
a second radio with a second peer-to-peer communication channel and a second client-server communication channel for communication in a second direction on the dual-ring communications network.

11. The system of claim 10, wherein each of the first station communications device and the second station communications device comprises:
a first radio with a first peer-to-peer communication channel and a first client-server communication channel for communication in a first direction on the dual-ring communications network; and
a second radio with a second peer-to-peer communication channel and a second client-server communication channel for communication in a second direction on the dual-ring communications network.

12. The system of claim 11, wherein the each of the first and second radios of each of the first and second station communications devices comprises:
a third communication channel to act as a repeater in the respective directions on the dual-ring communications network.

13. The system of claim 4, wherein the control communications device, the first station communications device, and the second station communications device each comprise a pair of radio communications devices.

14. The system of claim 4, further comprising a fertilizer delivery point to add fertilizer to a water channel in response to a control signal from one of: the flow control controller, the first flow monitoring station, and the second flow monitoring station.

15. The system of claim 4, further comprising a micro-hydro-generation turbine to supply electrical power to one of the flow control controller, the first flow monitoring station, and the second flow monitoring station.

16. The system of claim 4, wherein the client-server communication comprises SCADA communications.

17. A wide-area water flow control system, comprising:
a flow control station including:
a control automation controller,
a first plurality of communication devices to facilitate communication via a peer-to-peer communication protocol, and
a second plurality of communication devices to facilitate communication via client-server communications;
a plurality of flow monitoring stations that each include:
a station communications device with a plurality of communication ports to facilitate communication via at least the peer-to-peer communication protocol and the client-server communications,
a flow sensor to measure water flow within a water channel and transmit flow data to the flow control station via the station communications device, and
an adjustable water flow control device to control water flow within the water channel based on control signals received from the flow control station;
a peer-to-peer communication ring connecting the flow control station and the plurality of control monitoring stations in a ring topology; and
a client server communication ring facilitating client-server server client communications from the control communication device to each of the plurality of flow monitoring stations.

18. The system of claim 17, wherein each flow monitoring station measures water flow within a distinct water channel.

19. The system of claim 17, wherein the control automation controller is configured to:
receive the flow data from the flow sensors of each of the plurality of flow monitoring stations; and
transmit control signals to one or more of the flow monitoring stations based on the received flow data.

20. The system of claim 17, wherein the control automation controller is configured to calculate flow differentials based on the received flow data.

* * * * *